United States Patent
Maric (10) Patent No.: US 7,068,703 B2
(45) Date of Patent: Jun. 27, 2006

(54) FREQUENCY HOP SEQUENCES FOR MULTI-BAND COMMUNICATION SYSTEMS

(75) Inventor: Svetislav Maric, San Diego, CA (US)

(73) Assignee: Qualcomm, Incorporated, San Diego, CA (US)

( * ) Notice: Subject to any disclaimer, the term of this patent is extended or adjusted under 35 U.S.C. 154(b) by 50 days.

(21) Appl. No.: 10/368,736

(22) Filed: Feb. 18, 2003

(65) Prior Publication Data

US 2004/0161018 A1 Aug. 19, 2004

(51) Int. Cl.
*H04B 1/69* (2006.01)

(52) U.S. Cl. ............... 375/136; 375/133; 375/130; 370/342; 370/203

(58) Field of Classification Search ............ 375/134, 375/130, 136, 133, 132; 370/342, 203; 714/701
See application file for complete search history.

(56) References Cited

U.S. PATENT DOCUMENTS

| | | | |
|---|---|---|---|
| 4,099,148 A * | 7/1978 | Alsup et al. ............ 333/196 |
| 4,222,115 A * | 9/1980 | Cooper et al. ........... 375/130 |
| 6,347,385 B1 * | 2/2002 | Cui et al. ................ 714/701 |
| 6,553,018 B1 * | 4/2003 | Ichihara ................. 370/342 |
| 6,606,296 B1 * | 8/2003 | Kokkonen ............... 370/203 |
| 2004/0213326 A1 * | 10/2004 | Parizhsky et al. ........ 375/133 |

* cited by examiner

Primary Examiner—Stephen Chin
Assistant Examiner—Eva Zheng
(74) Attorney, Agent, or Firm—Philip R. Wadsworth; Sandip S. Minhas; Dmitry R. Milikovsky (57) ABSTRACT

Techniques to generate FH sequences having excellent correlation properties and to use these FH sequences in multi-band communication systems (e.g., OFDM systems). In one aspect, FH sequences may be generated based on an algebraic expression $y(k)=\log_\alpha b/k \pmod{p}$, where k is an index, p is an odd prime number, $\alpha$ is a primitive root of p, b is an integer, and (mod p) denotes modulo-p operation. Different FH sequences may be generated with different values for b, $\alpha$, and/or p. In another aspect, data may be transmitted using FH sequences generated based on the expression $y(k)=\log_\alpha b/k \pmod{p}$. In a first scheme, data may be transmitted on "traffic" channels, each of which may be associated with a respective FH sequence that determines the specific subband to use in each slot. In a second scheme, each data transmission is sent on subbands determined based on all or a portion of an FH sequence.

28 Claims, 6 Drawing Sheets

FREQUENCY HOP SEQUENCES FOR MULTI-BAND COMMUNICATION SYSTEMS

BACKGROUND

I. Field

The present invention relates generally to communication, and more specifically to techniques for generating and using frequency hop (FH) sequences in multi-band communication systems.

II. Background

In a frequency hopping spread spectrum (FHSS) communication system, data is transmitted on different frequency bands in different time intervals (which may also be referred to as "slots"). These frequency bands may be provided by orthogonal frequency division multiplexing (OFDM), other multi-carrier modulation techniques, or some other constructs. With FHSS, the data transmission hops from frequency band to frequency band in a pseudo-random manner. This allows the data transmission to better withstand deleterious path effects such as narrow-band interference, jamming, fading, and so on.

For a given data transmission, the specific frequency band to use in each slot is typically determined based on an FH sequence or code. Multiple data transmissions may be sent simultaneously using different FH sequences. These FH sequences are typically selected to have excellent auto-correlation and cross-correlation properties (described below). These properties ensure minimum interference among the multiple data transmissions due to time shifts and frequency offsets in these transmissions.

FH sequences with excellent correlation properties may be obtained based on computer searches or some other conventional methods. However, a computer search for FH sequences is often tedious and time consuming. Moreover, some of these other conventional methods provide non-optimal FH sequences having less than excellent correlation properties.

There is therefore a need in the art for techniques to efficiently generate good FH sequences and to use these FH sequences in multi-band communication systems (e.g., OFDM systems).

SUMMARY

Techniques are provided herein to generate FH sequences having excellent correlation properties and to use these FH sequences for various applications. In one aspect, FH sequences may be generated based on an algebraic expression $y(k) = \log_\alpha b/k \pmod{p}$, where k is an index for the elements in an FH sequence, p is an odd prime number, $\alpha$ is a primitive root of p, b is an integer selected such that $1 \leq b \leq (p-1)$, and (mod p) denotes modulo-p operation. Different FH sequences may be generated with different values for b, $\alpha$, and/or p, as described below.

In another aspect, data may be transmitted in various manners in a multi-band communication system using FH sequences generated based on the expression $y(k) = \log_\alpha b/k \pmod{p}$. In a first transmission scheme, data may be transmitted on individual "traffic" channels, each of which may be associated with a respective FH sequence that determines the specific subband to use in each slot. $N_d$ subbands available to transmit data may be used to form up to $N_d$ traffic channels. Each traffic channel may be assigned a static channel ID but dynamically mapped to different subbands in different slots based on its associated FH sequence. In a second transmission scheme, each data transmission is sent on subbands determined based on all or a portion of an FH sequence. For this scheme, the FH sequence may be parsed into multiple FH segments, and each FH segment may be assigned to a different data transmission. Each data transmission may be sent on the subbands determined by the assigned FH segment.

Various aspects and embodiments of the invention are described in further detail below.

BRIEF DESCRIPTION OF THE DRAWINGS

The features, nature, and advantages of the present invention will become more apparent from the detailed description set forth below when taken in conjunction with the drawings in which like reference characters identify correspondingly throughout and wherein.

DETAILED DESCRIPTION

The word "exemplary" is used herein to mean "serving as an example, instance, or illustration." Any embodiment or design described herein as "exemplary" is not necessarily to be construed as preferred or advantageous over other embodiments or designs.

Techniques are provided herein to generate FH sequences having excellent two-dimensional auto-correlation and cross-correlation properties (described below). These FH sequences may be used for various applications such as multi-band communication systems, radar, sonar, and so on.

In an aspect, FH sequences may be generated based on the following algebraic expression:

$$y(k) = \log_\alpha \frac{1}{k} \pmod{p}, \text{ for } 1 \leq k \leq (p-1), \quad \text{Eq (1)}$$

where k is an index for the elements in an FH sequence;
p is an odd prime number;
$\alpha$ is a primitive root of p;
(mod p) denotes modulo-p operation; and
y(k) represents an FH sequence with (p–1) elements.

The expression shown in equation (1) may be evaluated based on algebraic properties of finite fields, as described below.

An FH sequence generated based on equation (1) includes (p−1) elements or chips, each of which has a value that falls within a finite field defined by the Galois field GF(p). In particular, the value of each element of the FH sequence falls within a range of values [1 ... (p−1)]. This is ensured by the (mod p) operation in equation (1).

FH sequences of different lengths may be generated by selecting the proper values for the prime number p. For a given value of p, one or more FH sequences may be generated based on one or more primitive roots of p. A primitive root $\alpha$ of a prime number p has the property that it an be used to generate all (p−1) possible elements of the Galois field GF(p). This can be achieved by (1) raising the primitive root $\alpha$ by different powers from 1 to (p−1) and (2) performing the (mod p) operation on the exponentiated results. For a given value of p, the primitive roots of p are typically known or can be ascertained.

Figure 1:
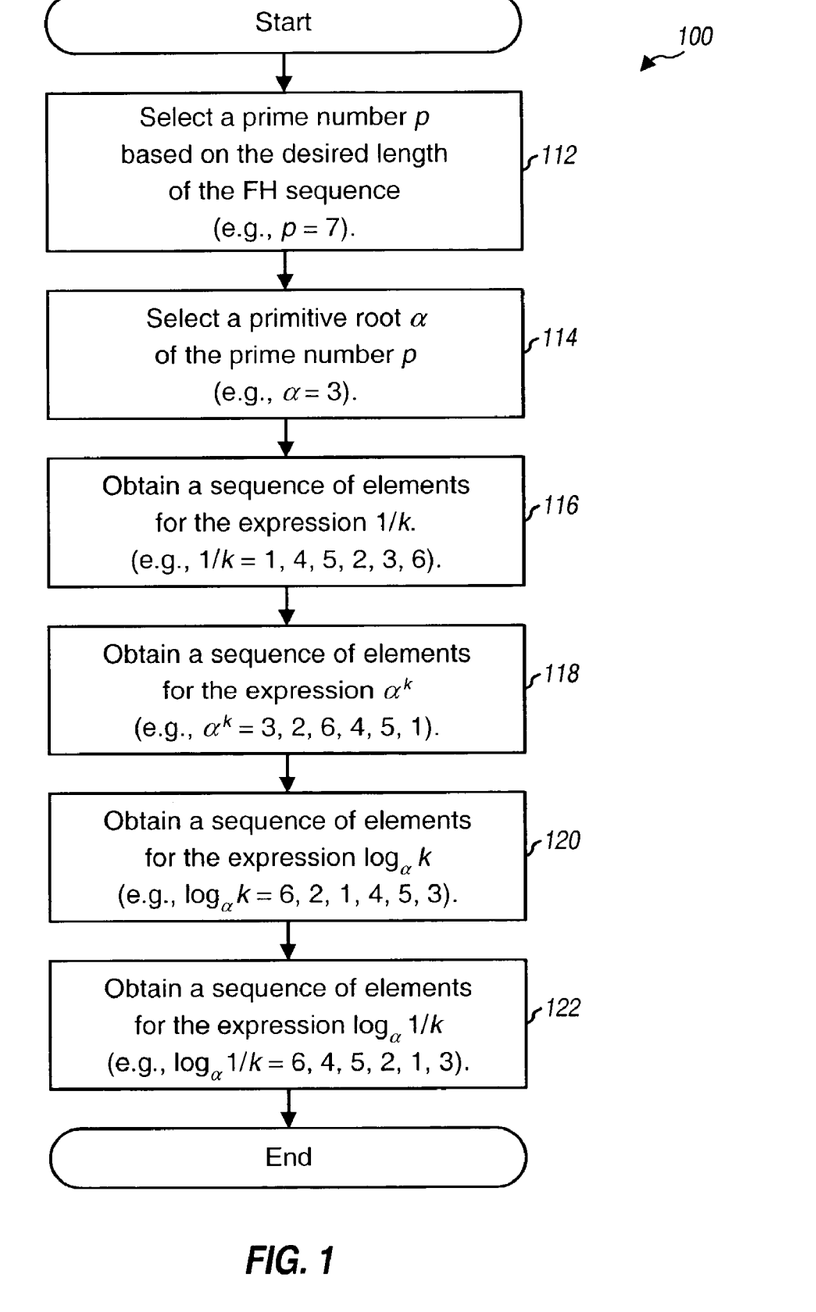
FIG. 1 shows a process for generating an FH sequence based on an algebraic expression $y(k) = \log_\alpha 1/k \pmod{p}$.

FIG. 1 shows a flow diagram of a process 100 for generating an FH sequence based on the algebraic expression shown in equation (1). Initially, a suitable prime number p that is larger than the desired length of the FH sequence is selected (step 112). For the example described below, the prime number is selected as p=7. Next, a primitive root $\alpha$ of the prime number p is selected (step 114). The prime number p may have multiple primitive roots, each of which may be used to generate a different FH sequence. For the example described below, the primitive root is selected as $\alpha=3$.

In the following description, the evaluation of various algebraic expressions such as $1/k$, $\alpha^k$, $\log_\alpha k$, $\log_\alpha 1/k$ is performed with the (mod p) operation. This ensures that the results for all these expressions fall within the Galois field GF(p).

A sequence of (p−1) elements for the expression "$1/k$" is first obtained (step 116) following property:

$$k \cdot k^{-1} (\bmod\ p) = 1, \text{ for } 1 \leq k \leq (p-1), \quad \text{Eq (2)}$$

where $k^{-1}$ is another representation for $1/k$. Equation (2) indicates that the product of k and its inverse, $k^{-1}$, is equal to one. TABLE 1 shows the results of the derivation for the expression "$1/k$" based on equation (2) and for p=7.

A sequence of (p−1) elements for the expression "$\alpha^k$" is next obtained (step 118). TABLE 2 shows the results of the derivation for the expression "$\alpha^k$" for p=7 and $\alpha=3$.

TABLE 1

| k | $k^{-1}$ | $k \cdot k^{-1}$ (mod p) |
|---|---|---|
| 1 | 1 | 1 (mod 7) = 1 |
| 2 | 4 | 8 (mod 7) = 1 |
| 3 | 5 | 15 (mod 7) = 1 |
| 4 | 2 | 8 (mod 7) = 1 |
| 5 | 3 | 15 (mod 7) = 1 |
| 6 | 6 | 36 (mod 7) = 1 |

TABLE 2

| k | $\alpha^k$ | $\alpha^k$ (mod p) |
|---|---|---|
| 1 | 3 | $3^1 = 3$ (mod 7) = 3 |
| 2 | 2 | $3^2 = 9$ (mod 7) = 2 |
| 3 | 6 | $3^3 = 27$ (mod 7) = 6 |
| 4 | 4 | $3^4 = 81$ (mod 7) = 4 |
| 5 | 5 | $3^5 = 243$ (mod 7) = 5 |
| 6 | 1 | $3^6 = 729$ (mod 7) = 1 |

A sequence of (p−1) elements for the expression "$\log_\alpha k$" is next obtained (step 120). This sequence may be obtained based on the following observation:

$$k \to \alpha^k, \quad \text{Eq (3a)}$$

is equivalent to $$\log_\alpha k \to \log_\alpha (\alpha^k) = k. \quad \text{Eq (3b)}$$

Equations (3a) and (3b) indicate that the mapping from k to $\alpha^k$ is the same as the mapping from $\log_\alpha k$ to k. Thus the mapping from k to $\log_\alpha k$ may be obtained by swapping the mapping from k to $\alpha^k$ to obtain a mapping from $\alpha^k$ to k, which may then be used as the mapping from k to $\log_\alpha k$.

TABLE 3 shows the results of the derivation for the expression "$\log_\alpha k$" based on the k to $\alpha^k$ mapping shown in TABLE 1 for p=7. The two leftmost columns in TABLE 3 are obtained from the second and first columns in TABLE 2, and the two rightmost columns in TABLE 3 are obtained by ordering the p−1 entries in the two leftmost columns in ascending order for k.

TABLE 3

| k $\alpha^k$ | $\log_\alpha k$ k | k $\alpha^k$ | $\log_\alpha k$ k |
|---|---|---|---|
| 3 | 1 | 1 | 6 |
| 2 | 2 | 2 | 2 |
| 6 | 3 | 3 | 1 |
| 4 | 4 | 4 | 4 |
| 5 | 5 | 5 | 5 |
| 1 | 6 | 6 | 3 |

Step 120 may be omitted since the sequence for $\alpha^k$ may be stored in a table, and the sequence for $\log_\alpha k$ may be obtained by properly indexing this table.

A sequence of (p−1) elements for the expression "$\log_\alpha 1/k$" is then obtained (step 122) by performing the following steps for each value of k, for $1 \leq k \leq (p-1)$:

determine $1/k$ (e.g., based on TABLE 1), and
determine $\log_\alpha 1/k$ (e.g., based on TABLE 3).

For the example above with p=7 and $\alpha=3$, for the first element k=1, the inverse is $1/k=1$ from TABLE 1, and $\log_\alpha 1/ = \log_\alpha 1 = 6$ from the two rightmost columns in TABLE 3. For the second element k=2, the inverse $1/k=4$ from TABLE 1, and $\log_\alpha 1/k = \log_\alpha 4 = 4$ from TABLE 3. Each of the remaining elements of the sequence for the expression $\log_\alpha 1/k$ may be obtained in similar manner. TABLE 4 shows the sequence of elements for $\log_\alpha 1/k$ for p=7 and $\alpha=3$ (second column). TABLE 4 also shows the sequence of elements for $\log_\alpha 1/k$ for p=7 and $\alpha=5$ (third column).

TABLE 4

| k | $\log_\alpha 1/k$ ($\alpha = 3$) | $\log_\alpha 1/k$ ($\alpha = 5$) |
|---|---|---|
| 1 | 6 | 6 |
| 2 | 4 | 2 |
| 3 | 5 | 1 |
| 4 | 2 | 4 |
| 5 | 1 | 5 |
| 6 | 3 | 3 |

For simplicity, the above description assumes that the entire sequence of elements for each intermediate expression ($1/k$, $\alpha^k$, and $\log_\alpha k$) is obtained for use to derive the sequence of elements for the expression $\log_\alpha 1k$. The sequence for $\log_\alpha 1/k$ may also be obtained piece-meal, e.g., for each value of k, one at a time, from k=1 to k=p−1.

It can be shown that FH sequences generated based on equation (1) have excellent two-dimensional (2-D) auto-correlation and cross-correlation properties. The excellent auto-correlation property comes from the fact that, for an FH sequence y(k) generated based on equation (1), the convolution of a frequency hop signal u(t, y(k)) generated using this FH sequence with the signal u(t+τ, y(k)+Δf) provides (a) a maximum value (i.e., a high peak) at zero frequency offset (Δf=0) and zero time shift (τ=0) and (b) a minimum value at other frequency offsets and/or time shifts (i.e., a small sidelobe of maximum height 1/N, where N is the length of FH sequence, for τ≠0 and Δf≠0). The excellent cross-correlation property comes from the fact that, for certain values of p, the convolution of the frequency hop signal u(t, y(k)) generated using the FH sequence y(k) with other frequency hop signals $u_i(t, y_i(k))$ generated using the other FH sequences $y_i(k)$ also provides a minimum value, where the other FH sequences $y_i(k)$ are also obtained based on equation (1) but with other suitable values for p and/or α.

Figure 2A:
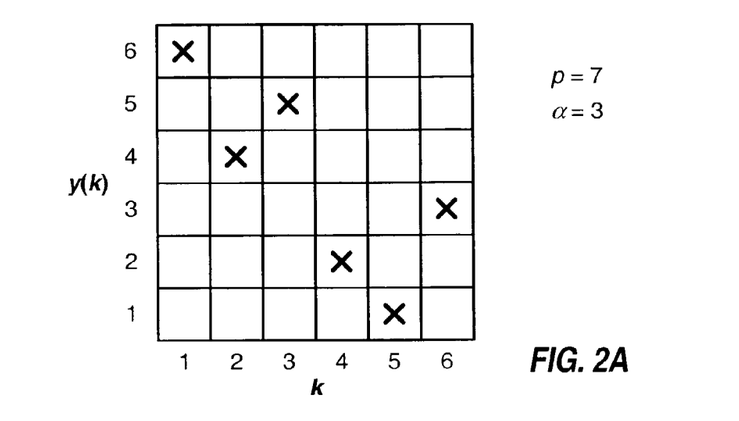
FIG. 2A shows the mapping of an FH sequence, for p=7 and $\alpha$=3, onto a two-dimensional array.

FIG. 2A shows the mapping of the exemplary FH sequence, generated based on equation (1) with p=7 and a =3, onto a square two-dimensional array of dimension (p−1)×(p−1). This mapping is achieved by marking an "x" in the box corresponding to the value of y(k), for each value of k (i.e., mapping the values shown in the second column in TABLE 4 against the values in the first column).

The excellent two-dimensional auto-correlation and cross-correlation properties may be graphically illustrated using the two-dimensional array. The excellent auto-correlation property comes from the fact that an FH sequence generated based on equation (1) will coincide with a 2-D shifted version of the same FH sequence in one or fewer location or box, for any shift of (x, y). For the shifted FH sequence, x denotes the number of shifts in the horizontal axis and y denotes the number of shifts in the vertical direction, where the shifted sequence can wrap around. The one or fewer coincidence for all possible 2-D shifts is ideal since clearly there must be coincidences for some 2-D shifts of the sequence. An FH sequence that satisfies this two-dimensional auto-correlation property is referred to as a Costas array.

The excellent two-dimensional cross-correlation property comes from the fact that an FH sequence generated based on equation (1) will coincide with a 2-D shifted version of another FH sequence (generated based on equation (1) with other suitable values for p and/or α, e.g., $\alpha_2=1/\alpha_1$) in at most two locations, for any shift of (x, y).

Figure 2B:
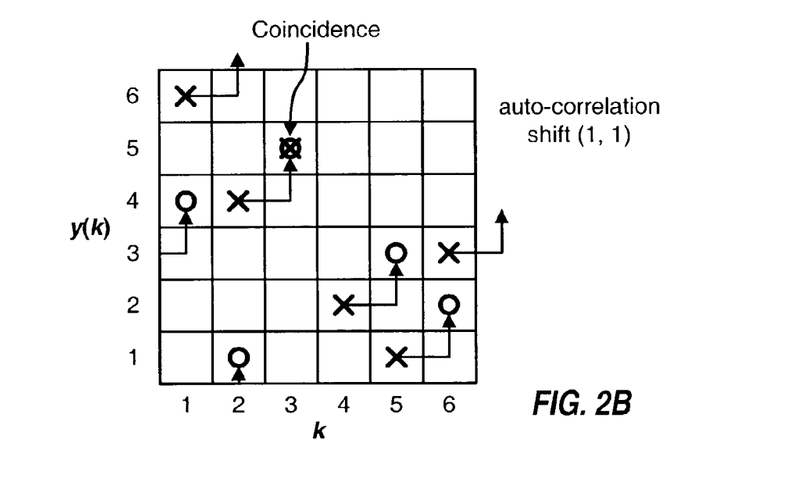
FIG. 2B illustrates two-dimensional auto-correlation of the FH sequence shown in FIG. 2A.

FIG. 2B illustrates the two-dimensional auto-correlation of the exemplary FH sequence shown in FIG. 2A. In FIG. 2B, the version that is shifted by (1, 1) (i.e., one to the right and one up) is indicated by the symbol "o". This shifted version coincides with the unshifted version at one location at k=3 and y(k)=5.

One property of FH sequences generated based on equation (1) is that the first element is always y(1)=p−1. Thus, for an FH sequence of length p−1 generated based on equation (1), a shorter FH sequence of length p−2 may be obtained by truncating the first element in the original FH sequence of length p−1. For the exemplary FH sequence y(k)=6, 4, 5, 2, 1, 3 shown in FIG. 2A, a shorter FH sequence y(k)=4, 5, 2, 1, 3 may be obtained by truncating the first element "6" in the original FH sequence. The shorter FH sequence would also have excellent two-dimensional auto-correlation and cross-correlation properties. For some FH sequences (i.e., for some values of p and α), a successively shorter FH sequence of length p−1−1 may be obtained by (1) shifting the elements of a longer FH sequence of length p−1 to the left until the first element is the one with the largest value, and (2) deleting this first element from the sequence.

Another property of an FH sequence generated based on equation (1) is that vertically shifted versions of the FH sequence also have excellent two-dimensional auto-correlation and cross-correlation properties, just like the unshifted FH sequence. The vertically shifted versions of the FH sequence may be expressed as:

$$y(k) = \log_\alpha \frac{b}{k} (\mathrm{mod}\ p), \text{ for } 1 \leq k \leq (p-1), \quad \text{Eq (4)}$$

where b, for 1<b≤(p−1), denotes the number of shifts in the vertical direction. As an element of the FH sequence is shifted vertically, it wraps around from the top of the array to the bottom due to the (mod p) operation.

Figure 2C:
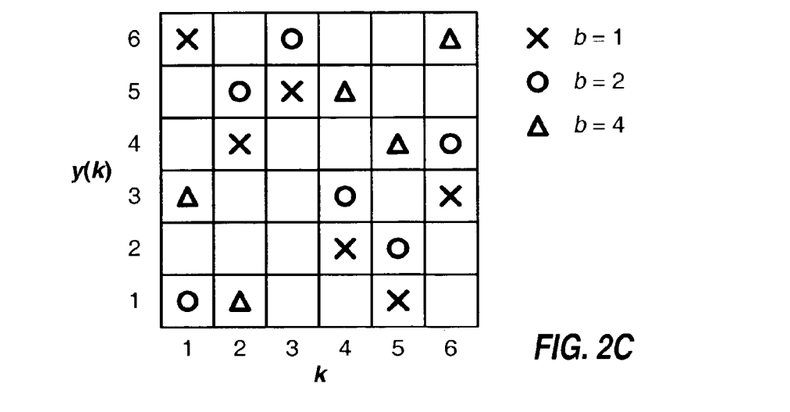
FIG. 2C shows the generation of different FH sequences by vertical shifting.

FIG. 2C shows the exemplary FH sequence shown in FIG. 2A and two other FH sequences generated by vertically shifting the exemplary FH sequence. The FH sequence generated with b=2 (i.e., one shift vertically) is shown by the symbol "o", and the FH sequence generated with b=4 (i.e., three shifts vertically) is shown by the symbol "Δ".

FH sequences generated algebraically based on equation (1) may be used for various applications. One such application is for frequency hopping in multi-band communication systems, which employ multiple frequency bands for data transmission. These multiple frequency bands may be provided by OFDM or some other construct. OFDM effectively partitions the overall system bandwidth into N orthogonal subbands, which are also referred to as tones, frequency bins, and so on. For OFDM, each of the N subbands is associated with a respective (digital) carrier upon which data may be modulated.

Figure 3A:
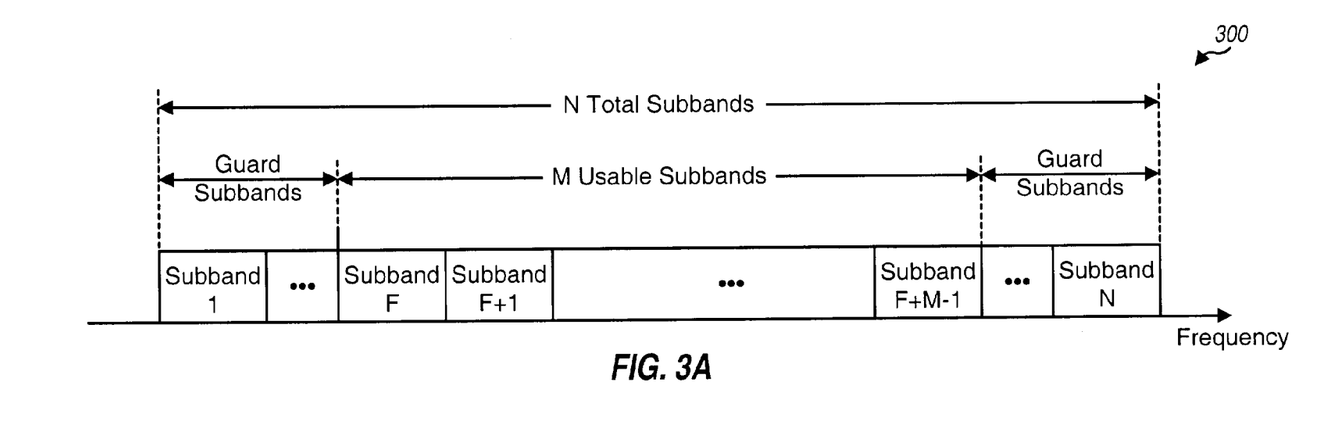
FIG. 3A shows a subband structure for an OFDM communication system.

FIG. 3A shows an exemplary subband structure 300 for an OFDM communication system. The system has an overall system bandwidth of W MHz, which is partitioned into N orthogonal subbands using OFDM. In a typical OFDM system, only M of the N total subbands are used for pilot and data transmission, where M<N. The remaining N−M subbands are not used and serve as guard subbands to allow the system to meet spectral mask requirements. The M usable subbands include subbands F through F+M−1, where F is an integer typically selected such that the M usable subbands are centered in the middle of the operating band.

Figure 3B:
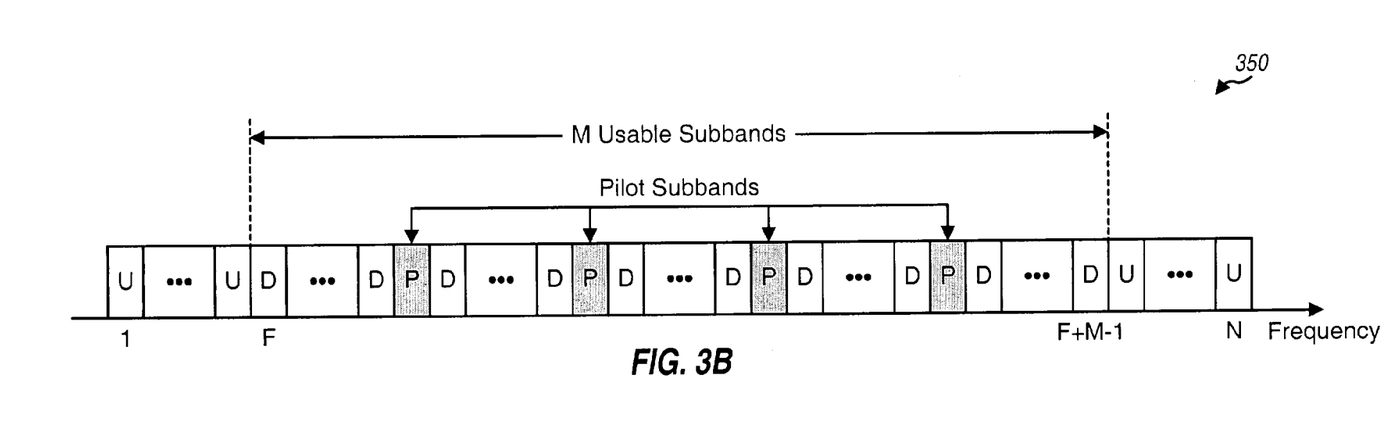
FIG. 3B shows a subband structure that may be used for pilot and data transmission in the OFDM system.

FIG. 3B shows an exemplary subband structure 350 that may be used for pilot and data transmission in the OFDM system. In this embodiment, $N_p$ subbands are used for pilot transmission, where $N_p$ may be selected based on various considerations such as the delay spread or frequency selectivity of the communication channel. The $N_p$ pilot subbands (which is denoted by shaded boxes with the letter "P" in FIG. 3B) may be uniformly distributed across the M usable subbands. The pilot subbands may be fixed (i.e., not changing over time) or dynamically changed. In general, the selection of $N_p$ and the specific subbands to use for pilot transmission are such that the receivers in the system are able to (1) obtain good estimates of the channel response, which may be used for coherent data demodulation, and (2) reliably detect the received pilot, which may be used for system acquisition, time tracking, frequency tracking, and so on. The $N_d=M-N_p$ remaining usable subbands may be used for data transmission (i.e., transmission of overhead data and user-specific data). These $N_d$ subbands are referred to as data subbands and are denoted with the letter "D" in FIG. 3B.

Data may be transmitted in various manners using FH sequences generated based on equation (1). In a first transmission scheme, data may be transmitted on individual "traffic" channels, each of which may be associated with a respective FH sequence that determines the specific subband to use for data transmission in each slot, as described below. In a second transmission scheme, data may be transmitted based on all or a portion of an FH sequence, as also described below.

For the first transmission scheme, the $N_d$ data subbands may be used to form up to $N_d$ traffic channels. Each traffic channel may be assigned a static channel ID. To implement frequency hopping, each traffic channel may be dynamically mapped to different subbands in different slots. The duration of a slot determines the hop rate and may be selected based on various considerations such as, for example, the coherence time of the communication channel (which is the time over which the channel is essentially constant), whether the system is operated synchronously or asynchronously, and so on. In general, a slot may span one or multiple OFDM symbol periods (defined below).

The mapping of a given traffic channel to subbands may be expressed as:

$$j = y(s,k), \qquad \text{Eq (5)}$$

where s is the channel ID for the traffic channel;

k is an index for slots;

y(s,k) is a function that defines an FH sequence for the traffic channel; and j is an index for the subband to use for the traffic channel in slot k.

The algebraic expression shown in equation (1) may be used for the FH function in equation (6). The traffic channels may be assigned different FH sequences in various manners, some of which are described below.

In a first embodiment, each of the $N_d$ traffic channels is assigned an FH sequence obtained with the same prime number p and primitive root α but a different value for b. The channel ID for each traffic channel may be mapped to b (e.g., s=b). The FH sequences for the traffic channels would then be vertically shifted versions of a "base" FH sequence generated with b=1.

Figure 4A:
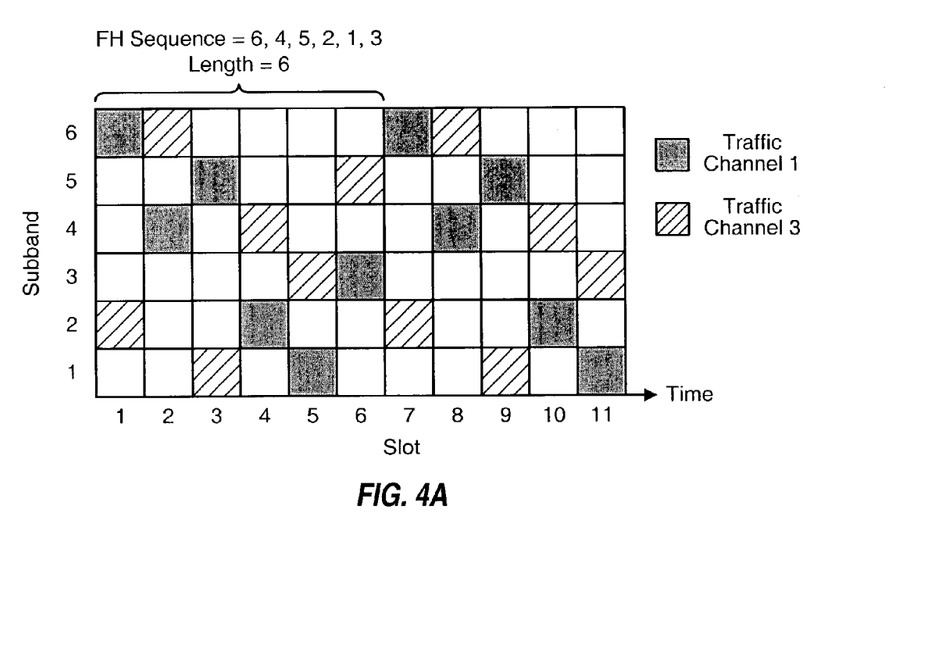
FIG. 4A shows a mapping of traffic channels to subbands based on the FH sequence shown in FIG. 2A.

FIG. 4A shows an exemplary mapping of traffic channels to subbands based on the exemplary FH sequence shown in FIG. 2A. For this example, $N_d=6$, and the six data subbands are assigned indices of j=1, 2, . . . , 6. These data subbands may not be contiguous because of the pilot subbands, which are not shown in FIG. 4A for simplicity. The FH sequence generated based on equation (1) with p=7 and α=3 (i.e., y(k)=6, 4, 5, 2, 1, 3) is used to map the traffic channels to subbands. In FIG. 4A, the traffic channels are assigned different FH sequences generated based on the same prime number (p=7) and primitive root (a=3) but with different vertical shifts (b=1, 2, . . . . 6). In this example, traffic channel 1 is associated with b=1, traffic channel 2 is associated with b=2, and so on.

The subbands used for traffic channel 1 are shown by the shaded boxes in FIG. 4A. In particular, the subband with index 6 is used for traffic channel 1 in slot 1, the subband with index 4 is used in slot 2, and so on. Since this FH sequence has a length of 6, the FH sequence may be repeated every 6 slots. The subbands used for traffic channel 3 are shown by the hashed boxes in FIG. 4A.

In a second embodiment, different traffic channels are assigned FH sequences obtained with different primitive roots (i.e., different values for α) of the same prime number p. The number of traffic channels ($N_c$) used for data transmission may be selected to be less than the number of data subbands (i.e., $N_c<N_d$) such that no two traffic channels use the same subband in any slot (i.e., no "collision"). This results in fewer than $N_d$ subbands being used (on average) for data transmission in each slot, a condition which is often referred to as "partial loading". This embodiment may provide improved performance over the first embodiment for an asynchronous system, since orthogonality among the vertically shifted versions of an FH sequence may be compromised by the asynchronous timing of the transmission sources.

In a third embodiment, different traffic channels are assigned FH sequences obtained with different prime numbers p. Again, the number of traffic channels may be less than the number of data subbands (i.e., $N_c<N_d$) such that no two traffic channels use the same subband in any slot.

In general, the traffic channels may be assigned FH sequences in various manners such that collisions are avoided and orthogonality is achieved. These FH sequences may be obtained with different vertical shifts, primitive roots, prime numbers, or any combination thereof.

For the second transmission scheme, each data transmission is sent on subbands determined based on all or a portion of an FH sequence. For this scheme, the FH sequence may be parsed into multiple FH segments, and each FH segment may be assigned to a different data transmission. The multiple FH segments may have the same length, which may simplify the processing at the transmitter and receiver. However, it may be possible to use FH segments of different lengths.

Figure 4B:
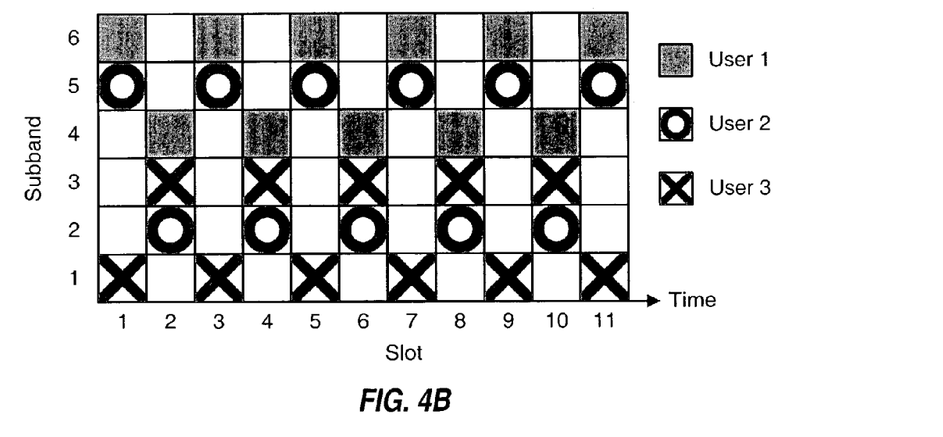
FIG. 4B shows an assignment of different FH segments to different users.

FIG. 4B shows an exemplary assignment of different FH segments to different users. For this example, three users are assigned three FH segments of the exemplary FH sequence shown in FIG. 2A, with user 1 being assigned the first FH segment comprised of elements 1 and 2 in the FH sequence, user 2 being assigned the second FH segment comprised of elements 3 and 4, and user 3 being assigned the third FH segment comprised of elements 5 and 6. User 1 may then transmit data on subbands 6 and 4 for elements 1 and 2, user 2 may transmit data on subbands 5 and 2 for elements 3 and 4, and user 3 may transmit data on subbands 3 and 1 for elements 5 and 6. The three users may simultaneously transmit data on the subbands indicated by their assigned FH segments, as shown in FIG. 4B. Moreover, since the FH segments have lengths of 2, the FH segments may be repeated every 2 slots.

For a third transmission scheme, each data transmission is assigned an FH sequence and may be sent on subbands determined based on a portion of the FH sequence. For this scheme, the FH sequence assigned to each data transmission may be mapped to a traffic channel, in the manner described above for FIG. 4A. However, each data transmission is not sent in all slots for that traffic channel. The specific slots to use may be determined by the specific segment assigned to the data transmission. Multiple data transmissions may be assigned to different portions of the same FH sequence.

Other transmission schemes may also be implemented, and this is within the scope of the invention.

Figure 5:
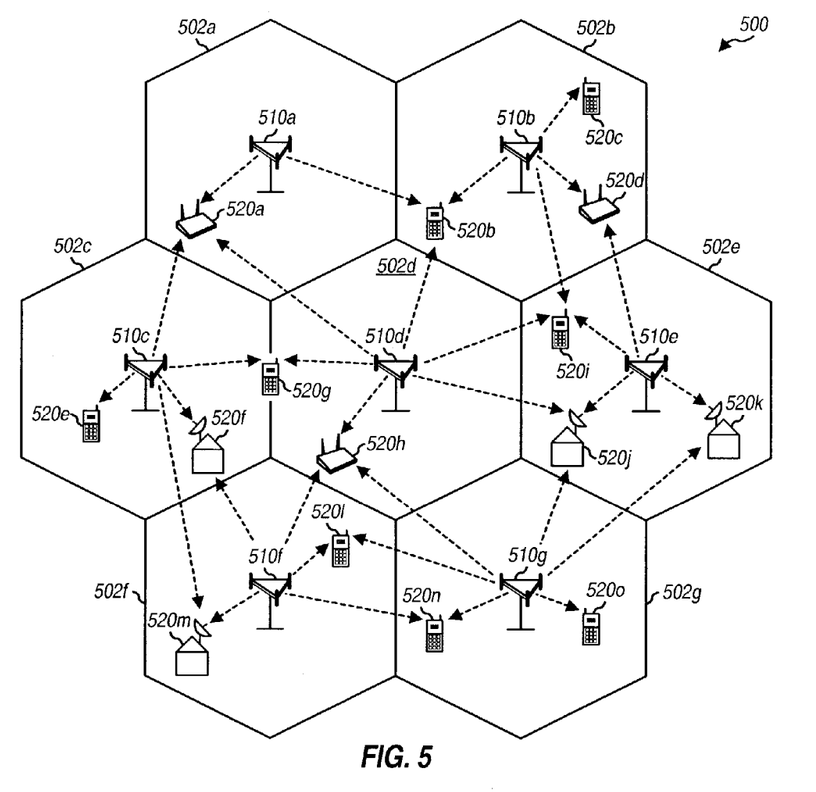
FIG. 5 shows a wireless multi-band communication system.

FIG. 5 shows a wireless multi-band communication system 500 that can support a number of users. System 500 includes a number of base stations 510 that provide communication for a number of terminals 520. A base station is a fixed station used for communicating with the terminals and may also be referred to as an access point, a Node B, or some other terminology.

Various terminals 520 may be dispersed throughout the system, and each terminal may be fixed (i.e., stationary) or mobile. A terminal may also be referred to as a mobile station, a remote station, a user equipment (UE), an access terminal, or some other terminology. Each terminal may communicate with one or possibly multiple base stations on the downlink and/or uplink at any given moment. In FIG. 5, terminals 520a through 520o can receive pilot, signaling, and user-specific data transmissions from base stations 510a through 510g.

System 500 may be an OFDM system or some other type of wireless communication system. System 500 may also be designed to implement any of the known standards and designs for CDMA, TDMA, and FDMA.

Each base station 510 in the system provides coverage for a particular geographic area 502. The coverage area of each base station is typically dependent on various factors (e.g., terrain, obstructions, and so on) but, for simplicity, is often represented by an ideal hexagon. A base station and/or its coverage area are also often referred to as a "cell", depending on the context in which the term is used.

To increase capacity, the coverage area of each base station may be partitioned into multiple sectors. If each cell is partitioned into three sectors, then each sector of a sectorized cell is often represented by an ideal 120° wedge that is 1/3 of the cell. Each sector may be served by a corresponding base transceiver subsystem (BTS). For a sectorized cell, the base station for that cell often includes all of the BTSs that serve the sectors of that cell. The term "sector" is also often used to refer to a BTS and/or its coverage area, depending on the context in which the term is used.

For each sector, the FH sequences used for the traffic channels in that sector may be selected such that the traffic channels are orthogonal to one another. This orthogonality is achieved by having different traffic channels use different data subbands for each slot. Orthogonality can be obtained by using different FH sequences (i.e., obtained with different values of b) for different traffic channels, as described above and shown in FIG. 4A).

Different sectors may use different sets of FH sequences so that the interference observed by the traffic channels of a given sector due to traffic channels of other sectors is randomized. For example, different sectors may use FH sequences of the same length but generated based on different primitive roots. As another example, different sectors may use FH sequences of different lengths generated based on different prime numbers. If the sectors are partially loaded, then the FH sequences used by each sector may be selected such that the probability of collision with the FH sequences used by other sectors is minimized.

Figure 6A:
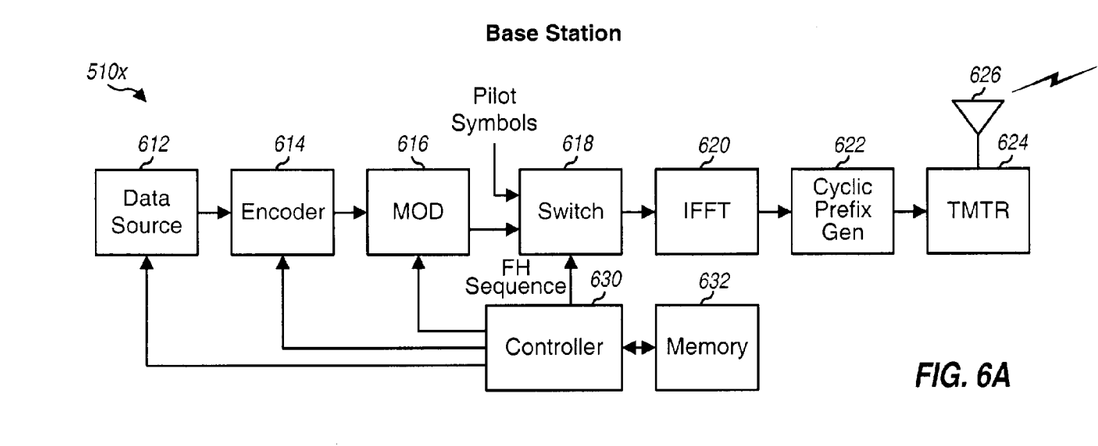
FIGS. 6A and 6B show block diagrams of a base station and a terminal, respectively.

FIG. 6A shows a block diagram of an embodiment of a base station 510x in multi-band communication system 500. For simplicity, only the transmitter portion of base station 510x is shown in FIG. 6A. Also for simplicity, data transmission for only one traffic channel is described below.

Within base station 510x, an encoder 614 receives traffic data from a data source 612 and control data and other data from a controller 630. The traffic data is designated for transmission on a particular traffic channel. The control data may include the channel ID and/or the FH sequence for the traffic channel used for data transmission. Encoder 614 formats, encodes, and interleaves the received data to provided coded data. A modulator (MOD) 616 then modulates (i.e., symbol maps) the coded data based on one or more modulation schemes to provide data modulation symbols (or simply, data symbols).

A switch 618 receives the data symbols and pilot symbols and multiplexes these symbols onto the proper data and pilot subbands. In particular, switch 618 provides pilot symbols to pilot subbands, (control) data symbols to subbands used for a control channel, and (traffic) data symbols to subbands used for the traffic channel. The traffic channel dynamically hops from subband to subband in a manner determined by the FH sequence assigned for the traffic channel (e.g., as shown in FIG. 4A). The particular subband to use for the traffic channel for each slot is determined by the value of the corresponding element in the FH sequence. Switch 618 also provides a signal value of zero for each subband not used for pilot or data transmission. For each OFDM symbol period, switch 618 provides a set of N output symbols (comprised of pilot symbols, data symbols, and zeros) for the N total subbands.

An inverse fast Fourier transform (IFFT) unit 620 receives and transforms the N symbols for each OFDM symbol period to the time domain using an inverse fast Fourier transform to obtain a "transformed" symbol that comprises N time-domain samples. To combat inter-symbol interference (ISI) caused by frequency selective fading, a portion of each transformed symbol is repeated by a cyclic prefix generator 622 to form a corresponding OFDM symbol that comprises $N+C_p$ samples, where $C_p$ denotes the number of samples being repeated. The repeated portion is often referred to as a cyclic prefix. An OFDM symbol period corresponds to the duration of one OFDM symbol, which is $N+C_p$ sample periods. Cyclic prefix generator 622 provides a stream of OFDM symbols. A transmitter unit (TMTR) 624 then processes the OFDM symbol stream to provide a downlink signal, which is then transmitted from an antenna 626 to the terminals.

Figure 6B:
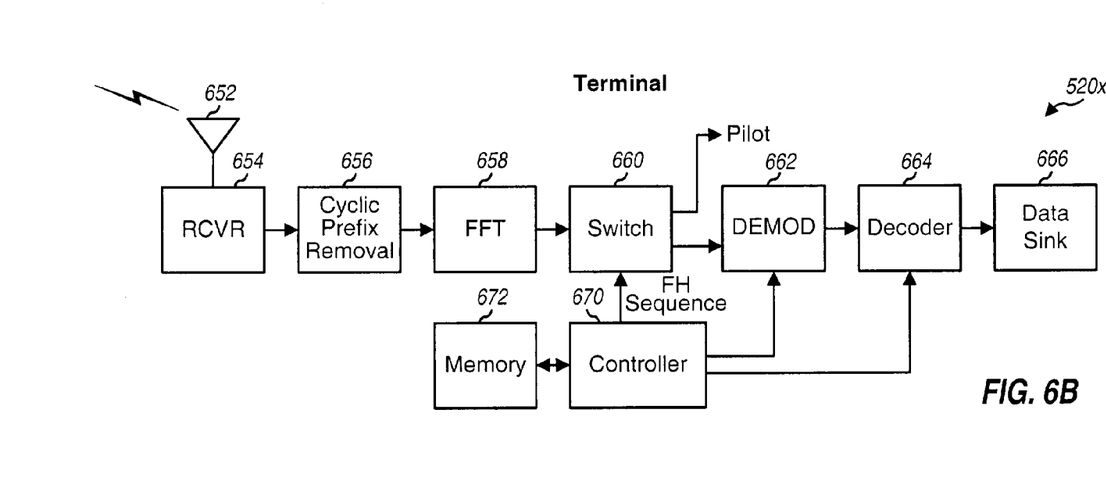

FIG. 6B shows a block diagram of an embodiment of a terminal 520x in multi-band communication system 500. For simplicity, only the receiver portion of terminal 520x is shown in FIG. 6B.

The downlink signal transmitted by base station 510x is received by an antenna 652, and the received signal is provided to and processed by a receiver unit (RCVR) (654) to provide samples. Each set of samples for one OFDM symbol period represents one received OFDM symbol. A cyclic prefix removal unit 656 removes the cyclic prefix appended to each OFDM symbol to obtain a corresponding received transformed symbol. An FFT unit 658 then transforms each received transformed symbol to the frequency domain to obtain N received symbols for the N total subbands.

A switch 660 obtains the N received symbols for each OFDM symbol period, provides the received symbols for the pilot subbands to a pilot processor (not shown), and provides the received symbols for the control channel and traffic channel to a demodulator (DEMOD) 662. Since the traffic channel dynamically hops from subband to subband, switch 660 operates in unison with switch 618 in base station 510x to provide the received symbols from the proper subband for the traffic channel. The FH sequence provided to and used by switch 660 is the same as the one used for switch 618 at the base station. The FH sequences at the base station and terminal are further synchronized.

Demodulator 662 then demodulates (i.e., symbol demaps) the received symbols for the traffic channel to provide demodulated data. A decoder 664 then decodes the demodulated data to provide decoded data for the traffic channel, which may be provided to a data sink 666 for storage. The processing for the control channel may be performed in similar manner. The processing by demodulator 664 and decoder 664 is complementary to that performed by modulator 616 and encoder 614, respectively.

Controllers 630 and 670 direct the operation at the base station and terminal, respectively. Memory units 632 and 672 provide storage for program codes and data used by controllers 630 and 670, respectively. Controllers 630 and 670 may be used to derive FH sequences used for data transmission and reception, if necessary. Memory units 632 and 672 may be used to store the FH sequences.

For clarity, FIGS. 6A and 6B respectively show the transmission and reception of a downlink data transmission with frequency hopping using an FH sequence generated based on equation (1). These techniques may also be used for data transmission on the uplink.

The FH sequences used for transmitting and receiving data may be static or dynamic. In one embodiment, the traffic channels may be assigned static FH sequences, and the particular FH sequence to use is dependent on the particular traffic channel selected for use. For this embodiment, the FH sequences for all traffic channels may be stored in memory, and the FH sequence for the selected traffic channel is retrieved from memory and used to determine the subbands to use for data transmission. In another embodiment, the traffic channels may be assigned FH sequences on the fly. For this embodiment, the particular FH sequence to use for the selected traffic channel may be generated as it is needed. FH sequences may be generated much more easily based on the algebraic expression shown in equation (1).

FH sequences generated based on equation (1) may also be used for other applications such as, for example, radar, sonar, and so on. A "chirp" signal u(t) may be generated based on an FH sequence y(k), as follows:

$$u(t) = \sum_{k=1}^{N_p} q(t - kT/N_p) e^{j[(w_c + w_k)t + \theta_k]}, \quad \text{Eq (6)}$$

where $w_c$ is the carrier frequency;
$w_k$ is the frequency offset from the carrier frequency for the k-th slot;
T is the duration or length of the chirp signal;
$N_p$ is the number of pulses in the chirp signal; and
q(t) is a pulse, which is defined as:

$$q(t) = \begin{cases} 1 & t \leq T/N_p \\ 0 & \text{elsewhere.} \end{cases}$$

The frequency offset $w_k$ is given as:

$$w_k = y(k) \frac{W}{N_p}, \text{ for } 1 \leq k \leq N_p,$$

where W is the system bandwidth.

The chirp signal u(t) may be used to determine both the distance (or range) to a target and the velocity (or speed) of the target, relative to a reference point. The range to the target may be determined based on round trip delay, which is the time it takes the chirp signal to travel from the reference point to the target and back. The velocity of the target may be determined based on the shift in the frequency of the chirp signal due to Doppler caused by reflection of the chirp signal from the moving target. The excellent two-dimensional correlation properties of the FH sequence generated based on equation (1) may be used to accurately determine both the time shift and the frequency offset of the received chirp signal. The determined time shift may then be used to compute the range to the target. The determined frequency offset may be used to compute the velocity of the target.

The techniques described herein for generating and using FH sequences may be implemented by various means. For example, these techniques may be implemented in hardware, software, or a combination thereof. For a hardware implementation, the elements used to implement any of the techniques described herein may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof.

For a software implementation, the techniques described herein may be implemented with modules (e.g., procedures, functions, and so on) that perform the functions described herein. The software codes may be stored in a memory unit (e.g., memory units 632 and 672 in FIGS. 6A and 6B) and executed by a processor (e.g., controllers 630 and 670). The memory unit may be implemented within the processor or external to the processor, in which case it can be communicatively coupled to the processor via various means as is known in the art.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method of obtaining a frequency hop (FH) sequence, comprising:
    obtaining a first sequence of elements for an expression 1/k, where k is an index for the elements in the first sequence; and
    obtaining a second sequence of elements for an expression $\log_\alpha$ 1/k based on the first sequence, wherein the expression 1/k and $\log_\alpha$ 1/k are evaluated with modulo-p operation, where p is a prime number and α is a primitive root of p, and wherein the FH sequence is derived based on the second sequence.

2. The method of claim 1, further comprising:
    obtaining a third sequence of elements for an expression $\alpha^k$, wherein the second sequence is further obtained based on the third sequence.

3. The method of claim 1, wherein the FH sequence is equal to the second sequence.

4. The method of claim 1, wherein the FH sequence is a vertically shifted version of the second sequence.

5. The method of claim 1. further comprising: selecting the prime number p based on a desired length for the second sequence.

6. The method of claim 1, wherein the FH sequence is used to determine a particular frequency band from among a plurality of frequency bands to use for data transmission in each of a plurality of time intervals.

7. A method of processing data for transmission in a multi-band communication system, comprising:
receiving data for transmission on a plurality of frequency bands;
determining a particular one of the plurality of frequency bands to use in each of a plurality of dine intervals based on a frequency hop (FH) sequence, wherein the FH sequence is generated based on an algebraic expression $y(k) = \log_\alpha 1/k$ (mod p), where p is a prime number, $\alpha$ is a primitive root of p, k is an index for elements of the FH sequence, and (mod p) denotes modulo-p operation; and
processing the data for transmission on frequency bands determined by the FH sequence.

8. The method of claim 7, wherein the data is processed for transmission on frequency bands corresponding to a portion of the FH sequence.

9. The method of claim 7, wherein the multi-band communication system implements orthogonal frequency division multiplexing (OFDM), and wherein the plurality of frequency bands correspond to subbands provided by OFDM.

10. The method of claim 9, wherein each time interval has a duration of one OFDM symbol period.

11. An apparatus in a multi-band communication system, comprising:
means for receiving data for transmission on a plurality of frequency bands;
means for determining a particular one of the plurality of frequency bands to use in each of a plurality of time intervals based on a frequency hop (FH) sequence, wherein the FH sequence is generated based on an algebraic expression $y(k) = \log_\alpha 1/k$ (mod p), where p is a prime number, $\alpha$ is a primitive root of p, k is an index for elements of the FH sequence, and (mod p) denotes modulo-p operation; and
means for processing the data for transmission on frequency bands determined by the FH sequence.

12. The apparatus of claim 11, wherein the data transmission is for a downlink in the multi-band communication system.

13. The apparatus of claim 11, wherein the data transmission is for an uplink in the multi-band communication system.

14. A transmitter unit in a multi-band communication system, comprising:
a modulator operative to modulate data for transmission on a plurality of frequency bands;
a switch operative to determine a particular one of the plurality of frequency bands to use in each of a plurality of lime intervals based on a frequency hop (FH) sequence, wherein the FH sequence is generated based on an algebraic expression $y(k) = \log_\alpha 1/k$ (mod p), where p is a prime number, $\alpha$ is a primitive root of p, k is an index for elements of the FH sequence, and (mod p) denotes inodulo-p operation; and
a signal processor operative to process the modulated data for transmission on frequency bands determined by the FH sequence.

15. The transmitter unit of claim 14, wherein the multi-band communication system implements orthogonal frequency division multiplexing (OFDM), wherein the plurality of frequency bands correspond to subbands provided by OFDM, and wherein the signal processor performs inverse Fourier transform on the modulated data.

16. A method of processing data for transmission in a multi-band communication system, comprising:
receiving data for transmission on a first traffic channel;
determining a particular one of a plurality of frequency bands to use forte first traffic channel in each of a plurality of time intervals based on a first frequency hop (FH) sequence, wherein the first FH sequence is assigned to the first traffic channel and generated based on an algebraic expression $y(k) = \log_\alpha 1/k$ (mod p), where p is a prime number, $\alpha$ is a primitive root of p, k is an index for elements of the first FH sequence, and (mod p) denotes modulo-p operation; and
processing the data for the first traffic channel for transmission on frequency bands determined by the first FH sequence.

17. The method of claim 16, further comprising:
receiving data for transmission on a second traffic channel;
determining a particular one of the plurality of frequency bands to use for the second traffic channel in each time interval based on a second FH sequence, wherein the second FH sequence is assigned to the second traffic channel and generated based on the algebraic expression $y(k) = \log_\alpha 1/k$ (mod p); and
processing the data for the second traffic channel for transmission on frequency bands determined by the second FH sequence.

18. The method of claim 17, wherein the second FH sequence is a vertically shifted version of the first FH sequence.

19. The method of claim 17, wherein the first and second FH sequences are generated based on different primitive roots of the same prime number.

20. The method of claim 17, wherein the first and second FH sequences are generated based on different prime numbers.

21. The method of claim 16, wherein the multi-band communication system implements orthogonal frequency division multiplexing (OFDM), and wherein the plurality of frequency bands correspond to subbands provided by OFDM.

22. A method of recovering a data transmission in a multi-band communication system, comprising:
obtaining received symbols for a plurality of frequency hands;
determining a particular one of the plurality of frequency bands used for the data transmission in each of a plurality of time intervals based on a frequency hop (FH) sequence, wherein the FH sequence is assigned to the data transmission and generated based on an algebraic expression $y(k) = \log_\alpha 1/k$ (mod p) where p is a prime number, $\alpha$ is a primitive root of p, k is an index for elements of the FH sequence, and (mod p) denotes modulo-p operation; and
processing received symbols for frequency bands determined by the FH sequence to recover the data transmission.

23. An apparatus in a multi-band communication system, comprising:
means for obtaining received symbols for a plurality of frequency bands;

means for determining a particular one of the plurality of frequency bands used for the data transmission in each of a plurality of time intervals based on a frequency hop (FH) sequence, wherein the FH sequence is assigned to the data transmission and generated based on an algebraic expression $y(k)=\log_\alpha 1/k \pmod{p}$, where p is a prime number, $\alpha$ is a primitive root of p, k is an index for elements of the FH sequence, and (mod p) denotes modulo-p operation; and means for processing received symbols for frequency bands determined by the FH sequence to recover the data transmission.

24. A method of obtaining a frequency hop sequence, comprising:

generating a first sequence of elements that are indexed;

obtaining a second sequence of elements utilizing a logarithmic function and a modulo operation from the elements of the first sequence, and generating a frequency hop sequence based upon the second sequence, wherein the logarithmic function comprises $\log_\alpha 1/k$ and the modulo operation comprises mod(p), where p is a prime number and $\alpha$ a is a primitive root of p.

25. The method of claim 24, further comprising obtaining a third sequence of elements for an expression $\alpha^k$, wherein the second sequence is further obtained based on the third sequence.

26. The method of claim 24, further comprising selecting the prime number p based on a desired length for the second sequence.

27. A transmitter comprising:

a controller that generates frequency hopping sequence utilizing a logarithmic function and a modulo operation;

a modulator that modulates data; and a switch that assigns a frequency of a plurality of frequencies to the data according to the frequency hopping sequence, wherein the logarithmic function comprises $\log_\alpha 1/k$ and the modulo operation comprises mod(p), where p is a prime number and $\alpha$ is a primitive root of p.

28. The transmitter of claim 27, wherein the controller selects the prime number p based on a desired length for the second sequence.

* * * * *